United States Patent [19]

Caprio et al.

[11] Patent Number: 4,582,346

[45] Date of Patent: Apr. 15, 1986

[54] DOCUMENT SECURITY SYSTEM

[75] Inventors: Richard D. Caprio, Niagara Falls; Roland L. Engle, Williamsville, both of N.Y.

[73] Assignee: Moore Business Forms, Inc., Grand Island, N.Y.

[21] Appl. No.: 608,343

[22] Filed: May 8, 1984

[51] Int. Cl.⁴ .............................................. B42D 15/00
[52] U.S. Cl. ...................................... 283/94; 283/93; 283/902; 355/133
[58] Field of Search .................... 355/133; 283/72, 94, 283/902, 93

[56] References Cited

U.S. PATENT DOCUMENTS

| 4,168,088 | 9/1979 | Somlyody ....................... 283/902 X |
| 4,310,180 | 1/1982 | Mowry, Jr. et al. ............. 283/94 X |
| 4,351,547 | 9/1982 | Brooks ............................ 283/902 X |
| 4,420,175 | 12/1983 | Mowry, Jr. et al. ............. 283/94 X |

OTHER PUBLICATIONS

Xerox Corporation Internal Memo May 22, 1975, from R. F. Lehman to A. Morganstein.

Primary Examiner—Paul A. Bell
Attorney, Agent, or Firm—Allegretti, Newitt, Witcoff & McAndrews, Ltd.

[57] ABSTRACT

A protected document includes background printed background matter and line pattern printed warning indicia. The warning indicia is slurrable upon copying to become visible.

14 Claims, 8 Drawing Figures

A PHOTOMICROGRAPH (10x) OF A HALFTONE FROM A PRESS SHEET WHICH SHOWS DOUBLING AND ELONGATION

A PHOTOMICROGRAPH (10x) OF A HALFTONE FROM A PRESS SHEET WHICH SHOWS DOUBLING AND ELONGATION

DOCUMENT SECURITY SYSTEM

BACKGROUND OF THE INVENTION

This invention relates to protected documents.

Modern copiers, and especially color xerography copiers, have greatly expanded the potential for document counterfeiting. An art of protected documents has developed as a result. This art is rooted in such engraved image practices as byzantine, embellished document backgrounds. This art has progressed to such developments as dot patterns including non-copyable small dots for background and copyable large dots for warning indicia.

Flaws in current protected documents included background densities which are unacceptably high, failure to function with poorly maintained or intentionally altered copiers, poor hiding of warning indicia, limits on compatible inks and density ranges and inflexibility in background color and pattern selection.

SUMMARY OF THE INVENTION

An object of the inventors in making this invention was to advance the art of protected documents.

More particular objects were to overcome as many as possible of the flaws in current protected documents.

Another object was to provide substantial freedom in the selection of background color and design of highly protected documents.

A further object was to provide a redundantly protected document.

With the foregoing objects before them, the inventors discovered a new technique for document protection. This technique abandons principal reliance upon the dot size suggestions of the prior art. The technique exploits copier directional slur. Copier directional slur is a phenomenon caused by toner drag, or the elongation of the trailing edges of images as toner is deposited onto copying drums. The phenomenon results in elongated copier images as shown in FIG. 1 of the accompanying drawing. Slurring is not visible with even a 10x magnifier in a properly maintained copier, but is visible on a poorly maintained copier, and is present, though not readily visible, even with the properly maintained copier.

In a principal aspect then, this invention is a protected document comprising a substrate having a surface, background printed matter on a first portion of the surface, and warning printed matter on a second portion of the surface within the first portion. The warning printed matter is formed such that upon xerographic copying of the document, the warning indicia slurs to become visible.

With the invention, a protected document functions predictably and consistently. Suitable low densities can be employed. Matching of densities between the background printed matter and the warning indicia is possible and desirable, for improved hiding of the warning indicia. The indicia can be buried in an ornamentally patterned emblem, leaving document background unrestricted in color and pattern.

These and other objects, aspects and advantages of the invention are set forth in the detailed description, which follows.

BRIEF DESCRIPTION OF THE DRAWING

The preferred embodiments of the invention will be described in relation to the accompanying drawing. The drawing consists of four figures, as follows.

DETAILED DESCRIPTION OF THE PREFERRED EMBODIMENTS

Figure 1:
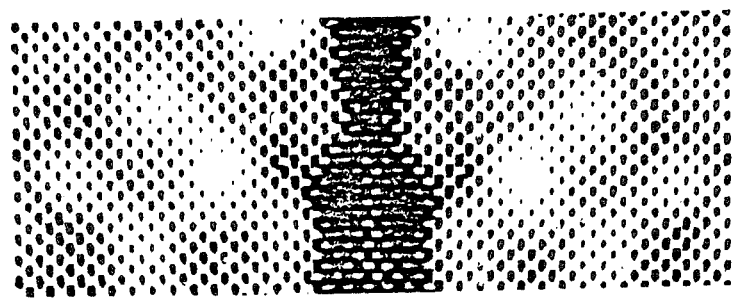
FIG. 1 is a photomicrograph (10×) of a halftone from a press sheet which shows doubling and elongation.
Figure 2:
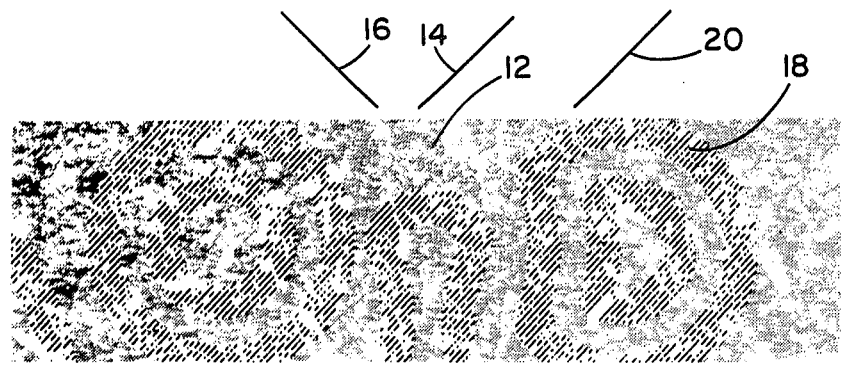
FIG. 2 is a photomicrograph of a portion of a first preferred embodiment of the invention.

The first preferred embodiment, shown in FIG. 2, is a protected document including a sheet or substrate with a face surface as shown. Background printed matter 12 is on a first portion of the face surface. The matter 12 is in a dot pattern, printed on the face surface with a dot pattern screen of 5% density and 133 rows per inch. The dot pattern has first and second dot pattern angles 14, 16 at right angles to each other. The angle 14 is aligned with, or defines, the dot pattern rows. The angle 16 defines dot pattern columns.

Warning printed indicia 18 in the form of running repetition of the word "Void" is also on the face surface. The warning indicia 18 is on a second portion of the face surface. The second portion is within the first portion, and the second portion is in the shape of the indicia 18, or in the form of the words thereof. As most preferred, the letters of the words are in free form print, with smaller letters spaced across widths of the background matter inside larger letters. The warning indicia 18 is printed in a line pattern by a line pattern screen of 66 lines per inch. The density of the warning indicia is 7½%. The line pattern of the indicia has a line pattern angle 20 parallel to the dot pattern angle 14. The line pattern angle 20 defines the lines of the matter 18.

Figure 4:
FIG. 4 is a photomicrograph of a xerographic copy of the portion of the first preferred embodiment as in FIG. 2.

As a result of the nearly matching densities of the background printed matter 12 and the warning indicia matter 18, the warning matter 18 is well hidden in the background matter 12. When the document of FIG. 2 is copied, the directional slur of the copier slurs the lines of the warning matter 18, increasing the thickness of the lines and making the lines pronounced. The background dot pattern may or may not reproduce, depending on dot size. Generally, the copied document will appear as in FIG. 4.

Figure 3:
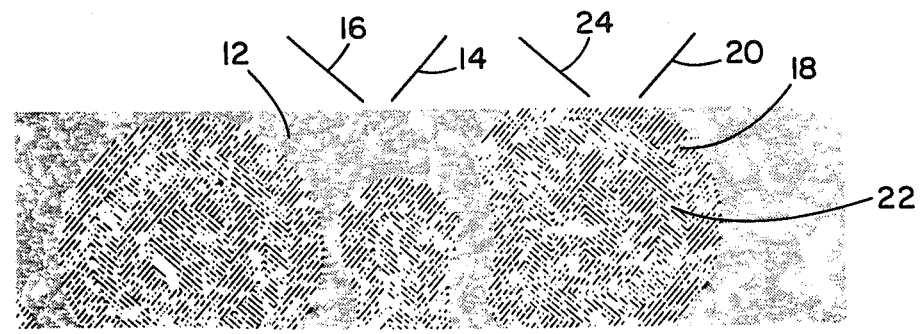
FIG. 3 is a photomicrograph of a portion of a second preferred embodiment of the invention.

Referring now to FIG. 3, the second and more preferred embodiment includes the same matter 12, 18. Second warning indicia 22 are positioned in a third portion of the face surface, which is in segments immediately adjacent the second portion. As most preferred, the third portion is defined by the widths or spaces between the large and small letters of the warning indicia 18. The indicia 22 is also printed in a line pattern, 66 lines per inch, and has a 7½% matching density. A line pattern angle 24 of the indicia 22 is perpendicualr to the line pattern angle 20, and parallel to the dot pattern angle 16. When the second preferred embodiment is copied, either the indicia 18 or the indicia 22 is slurred, depending on orientation with a copier.

Figure 5:
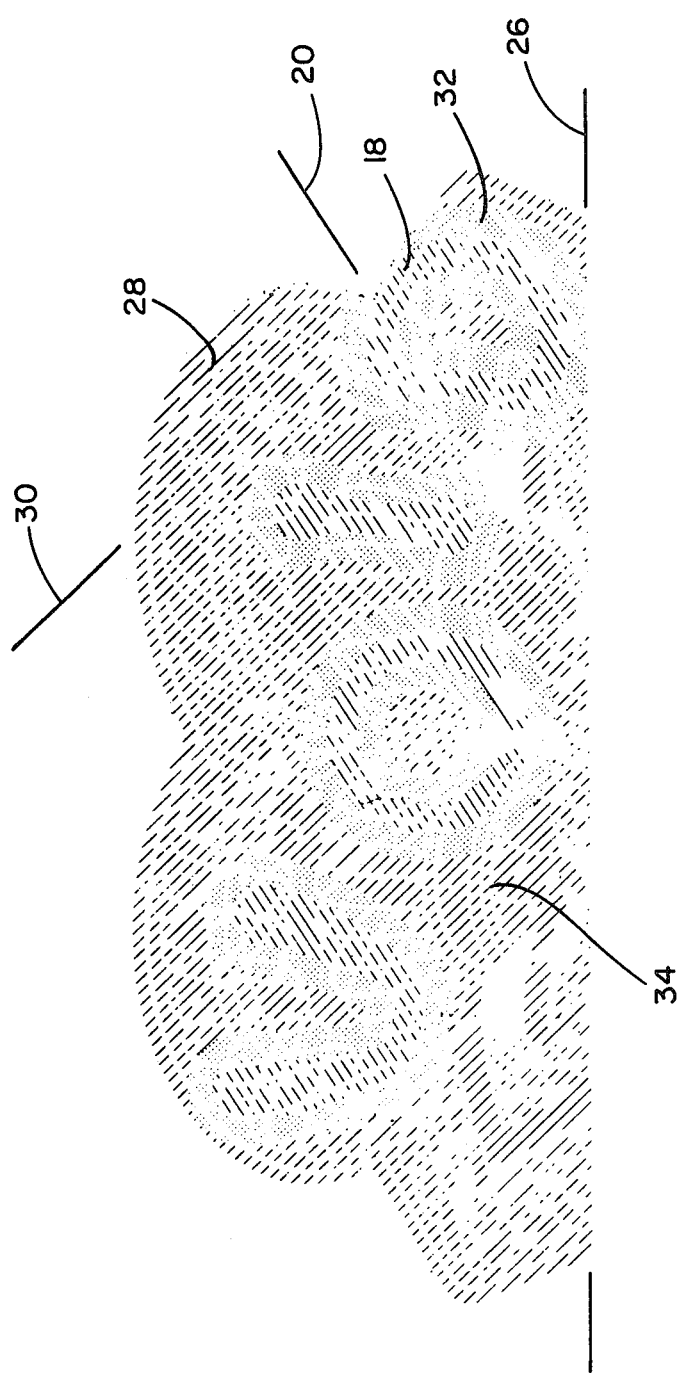
FIG. 5 is a photomicrograph of a half of a third preferred embodiment of the invention.

Referring to FIG. 5, the third and still more preferred embodiment includes the matter 12 (not shown in FIG. 5) or any alternative background pattern desired, in a dot pattern or any other pattern desired. The first warning printed matter 18 is again on a second portion of the face surface, with the second portion being a part of an emblem portion of the surface. The emblem portion includes the emblem half shown, and a second emblem half as will be described.

The first warning printed matter 18 is again in the form of the word "Void", and the letters of the word are in free form print. The word "Void" appears once in the matter 18. The matter 18 is line printed, with a line pattern angle 20.

The second emblem half is, in outline and outline only, a mirror image of the first emblem half about the central line 26. As will be described, the content of the two emblem halfs are not mirror images of each other.

The second warning printed matter 22 is again line printed matter, with a line pattern angle 24. The angle 24 is skewed from and perpendicular to the angle 20. However, unlike the second embodiment, the second warning printed matter 22 also is in the form of the word "Void", in free form print. The direction of printing is perpendicular to that of the word formed by the matter 18, such that the word of the matter 22 is readable from the side of the emblem, such as the left side in FIG. 5.

First warning-obscuring printed matter 28 is on the first emblem half, in the second portion of the face surface with the matter 18. The first warning-obscuring matter 28 is line printed matter, and has a line pattern angle 30. The angle 30 is perpendicular to the line pattern angle 20. The matter 28 occupies substantially all of the first emblem half with the matter 18. The matter 28 encircles the letters of the matter 18, and is within the centers of the letters.

The first emblem half does include dot printed matter 32. The dot printed matter 32 encircles the letters or other numbers or symbols of the matter 18, immediately outside the letters, between the matter 18 and the matter 28. The dot printed matter 32 also is encircled by some letters of the matter 18, between the matter 18 and the matter 28. The dot printed matter 32 forms the same message as the matter 18.

The first emblem half is embellished with a pattern of blank lines 34 in an ornamental pattern. The lines 34 curve through the matter 18, 28, 32 and interrupt the matter 18, 28, 32. As a result, the distinctness of the matter 18, 28, 32 is obscured, as in the message of the matter 18.

The lines of the matter 18 and 28 slurrable, and the matter 32 is non-copyable. Upon xerographic copying of the first emblem half, the matter 32 does not copy. Either the matter 18 or 28 slurs, or both slur.

The second emblem half is similar to the first emblem half Second warning-obscuring matter, more dot pattern matter, and a pattern of blank lines are on the second emblem half. The pattern of blank lines is a mirror image of pattern of lines 34. The second warning-obscuring matter is line printed matter, and has a line pattern angle perpendicular to the line pattern angles 24, 30 of the second warning printed matter and the first warning-obscuring matter, respectively. Thus, the line pattern angle of the second warning-obscuring matter is parallel to the line pattern angle 20.

The additional dot pattern matter encircles and is encircled by the second warning printed matter as the first dot pattern matter encircles and is encircled by the first warning printed matter.

Figure 6:
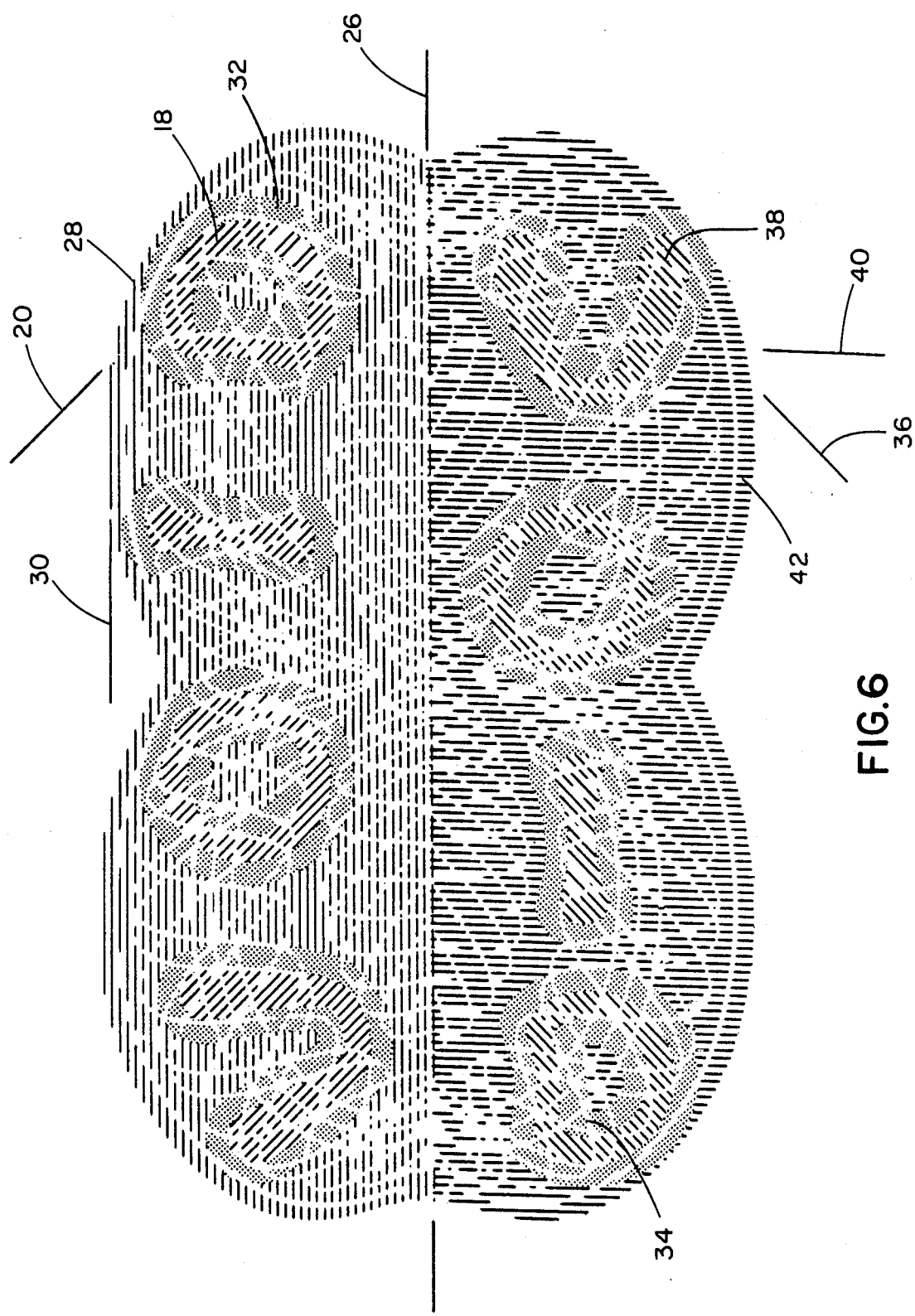
FIG. 6 is a photomicrograph of a half of a fourth and most preferred embodiment of the invention.
Figure 7:
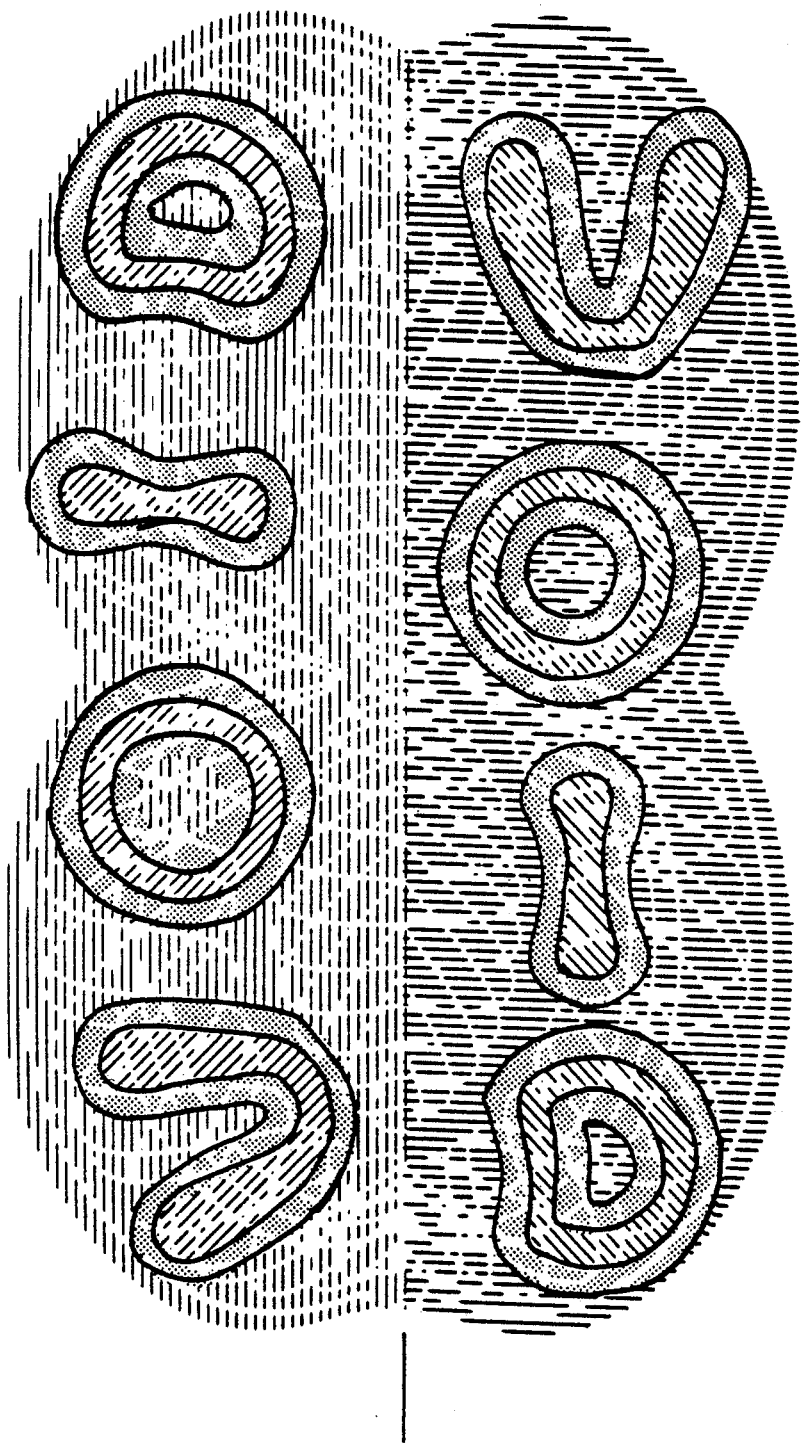
FIG. 7 is a photomicrograph like FIG. 6, with overlining for teaching purposes only.
Figure 8:
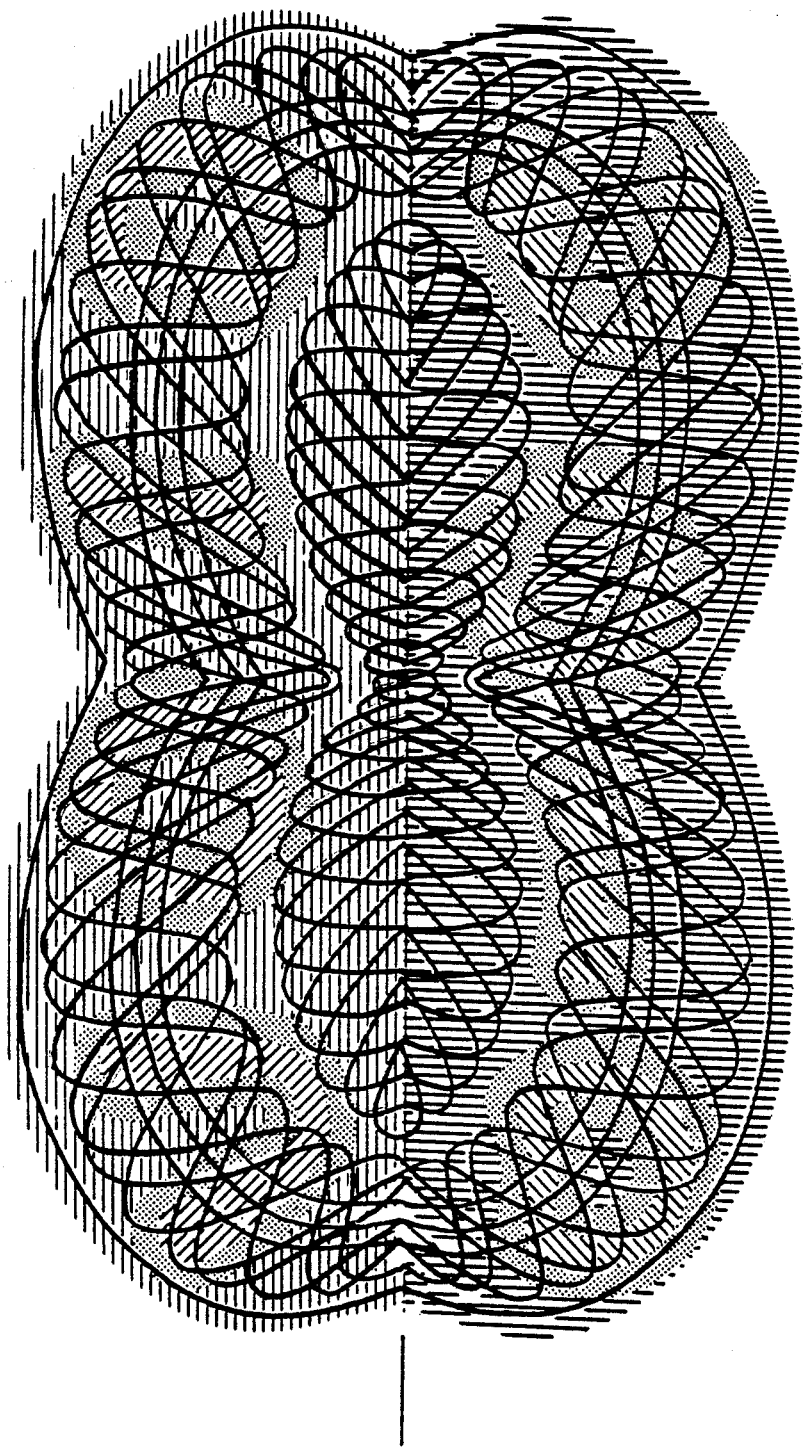
FIG. 8 is a photomicrograph like FIG. 7, with further overlining for teaching only.

Referring to FIGS. 6-8, the fourth preferred embodiment includes all the elements of the third preferred embodiment. In the third preferred embodiment, all the line pattern angles such as 20, 30 are angled approximately 45 degrees to the central line 26. In the fourth preferred embodiment, only the line pattern angles 20, 36 of the first and second warning printed matter 18, 38 are at 45 degrees to the central line 26. In the fourth preferred embodiment, the line pattern angle 30 of the first warning-obscuring matter 28 is parallel to the central line 26. The line pattern angle 40 of the second warning-obscuring matter 42 is perpendicular to the line 26. Thus, the line pattern angles have the following complex relation to each and to the line 26: the line pattern angle 20 of the first warning printed matter (hereafter "the first line pattern angle 20") is at 45 degrees to the line 26; the line pattern angle 36 of the second warning printed matter (hereinafter "the second line pattern angle 36") is perpenduclar to the first line pattern angle 20; the line pattern angle 30 of the first warning-obscuring matter (hereafter "the third line pattern angle 30") is at approximately 45 degrees to the first and second line pattern angles 20, 36; and the line pattern angle 40 of the second warning-obscuring matter is at approximately 45 degrees to the first and second line pattern angles 20, 36, and perpendicular to the third line pattern angle 30.

The fourth preferred embodiment results in the most obscured warning message and is most preferred for this reason. FIG. 7 is provided with the various matter of the fourth preferred embodiment separated by overline for illustration only, to permit the reader to readily discern the various matter of the fourth preferred embodiment. FIG. 8 is provided with the pattern of blank lines in the fourth preferred embodiment overlines, for the same reason.

The fourth preferred embodiment is also most preferred because the complex relationship of line pattern angles has at least one set of the lines of the various matters slurrable in any position of a document on a copier. As a result, the fourth preferred embodiment is the most secure embodiment.

With the third and fourth preferred embodiments, the emblem of the document is the security portion of the document. The background of the document is freed of security restricitions, and may be a dot pattern, a company logo pattern or any other pattern, picture of the like which is desired. The background may also be any color desired.

Also with the third and fourth preferred embodiments, the dot pattern within the emblem acts as a fail-safe feature.

Densities in the third and fourth embodiments are matched as in the first and second embodiments. In addition to the other described advantages, the emblem areas of the third and fourth documents can be checked with lenticular screens for authenticity. Such checking is not intended to reveal supposed originals to be copies, but is intended to reveal counterfeit originals to be lacking in warning printed matter. Orientation of a lenticular screen with the warning printed matter of a genuine original will readily reveal the warning printed to the naked eye.

The invention and the four preferred embodiments are now described in such full, clear, concise and exact terms as to enable a person of ordinary skill in the art to make and use the same. To particularly point out and distinctly claim the subject matter regarded as invention, the following claims conclude this specification.

What is claimed is:

1. A protected document comprising
a substrate having a surface;
background printed matter on a first portion of the surface; and
first warning printed matter on a second portion of the surface within the first portion;
the first warning printed matter being formed in a slurrable pattern such that upon xerographic copying of the document the first warning printed matter is slurrable to become visible.

2. A protected document as in claim 1 in which the background printed matter is substantially non-copyable such that upon xerographic copying of the document, the background printed matter does not copy.

3. A protected document as in claim 1 in which the background printed matter is dot printed matter and in which the warning printed matter is line printed matter.

4. A protected document as in claim 3 in which the dot printed matter has a dot pattern angle defining rows of the dot printed matter and the line printed matter has a line pattern angle defining lines of the line printed matter, the dot pattern angle and the line pattern angle being parallel.

5. A protected document as in claim 1 further comprising second warning printed matter on a third portion of the surface within the first portion adjacent the second portion, the second warning printed matter being formed in a slurrable pattern at an angle to the first warning printed matter such that upon xerographic copying of the document, the second warning printed matter is slurrable to become visible.

6. A protected document as in claim 5 in which the second warning printed matter is line printed matter having a second line pattern angle perpendicular to the first line pattern angle.

7. A protected document as in claim 5 in which the second portion of the surface is in segments and the third portion of the surface is in encircling segments which encircle the segments of the second portion.

8. A protected document as in claim 5 in which the second portion and the third portion of the surface constitute an emblem portion of the surface.

9. A protected document as in claim 8 in which the first warning printed matter forms a first readable message and the second warning printed matter forms a second readable message, the second readable message being perpendicular to the first readable message.

10. A protected document as in claim 8 in which the second warning printed matter is line printed matter having a second line pattern angle perpendicular to the first line pattern angle.

11. A protected document as in claim 5 of claim 8 further comprising second warning-obscuring printed matter on the third portion of the surface with the second warning printed matter, the second warning-obscuring printed matter being formed in a slurrable pattern at an angle to the first warning printed matter, the second warning printed matter and the first warning-obscuring printed matter such that upon xerographic copying of the document, the second warning-obscuring printed matter is slurrable to become visible.

12. A protected document as in claim 11 in which the second warning printed matter is line printed matter having a second line pattern angle perpendicular to the first line pattern angle, in which the first warning-obscuring printed matter is line printed matter having a third line pattern angle approximately 45 degrees to the first line pattern and and the second line pattern angle, and in which the second warning-obscuring printed matter is line printed matter having a fourth line pattern angle approximately 45 degrees to the first line pattern angle and the second line pattern angle and perpendicular to the third line pattern angle.

13. A protected document as in claim 5 or claim 8 further comprising first warning-obscuring printed matter on the second portion of the surface with the first warning printed matter, the first warning-obscuring printed matter being formed in a slurrable pattern at an angle to the first warning printed matter and the second warning printed matter such that upon xerographic copying of the document, the first warning-obscuring printed matter is slurrable to become visible.

14. A protected document as in claim 13 further comprising non-copyable dot pattern printed matter in the second portion of the surface about the first warning printed matter and in the third portion of the surface about the second warning printed matter.

* * * * *